US012805438B2

(12) United States Patent
Martin et al.

(10) Patent No.: US 12,805,438 B2
(45) Date of Patent: Nov. 24, 2026

(54) INDEPENDENT REEL POSITION CONTROL FOR AN AGRICULTURAL HARVESTER HEADER

(71) Applicant: CNH Industrial America LLC, New Holland, PA (US)

(72) Inventors: Jethro Martin, Ephrata, PA (US); Cory Douglas Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 310 days.

(21) Appl. No.: 18/290,967

(22) PCT Filed: Jul. 21, 2022

(86) PCT No.: PCT/US2022/037789

§ 371 (c)(1),
(2) Date: Jan. 22, 2024

(87) PCT Pub. No.: WO2023/003992

PCT Pub. Date: Jan. 26, 2023

(65) Prior Publication Data

US 2024/0245001 A1 Jul. 25, 2024

Related U.S. Application Data

(60) Provisional application No. 63/224,635, filed on Jul. 22, 2021.

(51) Int. Cl.
*A01D 41/14* (2006.01)
*A01D 57/04* (2006.01)

(52) U.S. Cl.
CPC ........... *A01D 41/141* (2013.01); *A01D 57/04* (2013.01)

(58) Field of Classification Search
CPC .............................. A01D 41/141; A01D 57/04
See application file for complete search history.

(56) References Cited

U.S. PATENT DOCUMENTS 3,456,437 A * 7/1969 Kasaczun ............. F04D 27/023 417/20
4,407,109 A 10/1983 Swanson et al.
(Continued)

FOREIGN PATENT DOCUMENTS

EP 2253195 A1 11/2010
EP 3420801 A1 1/2019
(Continued)

OTHER PUBLICATIONS

International Search Report and Written Opinion prepared for PCT Application No. PCT/US2022/037789 dated Nov. 4, 2022 (11 pages).
(Continued)

*Primary Examiner* — Cathleen R Hutchins
(74) *Attorney, Agent, or Firm* — Fletcher Yoder, P.C.

(57) ABSTRACT

An agricultural harvester header with a reel having two or more reel arms that support the reel at either end of one or more reel segments. The positions of each reel arm can be independently controlled such that each reel segment can be raised lowered, tilted left, or tilted right to optimally engage oncoming crop canopy contour regardless of ground contour.

11 Claims, 7 Drawing Sheets

(56) References Cited

U.S. PATENT DOCUMENTS

| | | | | |
|---|---|---|---|---|
| 6,138,447 | A * | 10/2000 | Stivers | A01D 57/02 56/14.4 |
| 7,866,132 | B2 | 1/2011 | Killen et al. | |
| 2010/0293914 | A1* | 11/2010 | Killen | A01D 57/04 56/128 |
| 2019/0003495 | A1* | 1/2019 | Hunt | A01D 57/04 |
| 2019/0003496 | A1 | 1/2019 | Hunt et al. | |
| 2021/0185877 | A1 | 6/2021 | Hunt et al. | |
| 2022/0369556 | A1 | 11/2022 | Yanke et al. | |

FOREIGN PATENT DOCUMENTS

| | | | |
|---|---|---|---|
| EP | 3811764 | A1 | 4/2021 |
| EP | 3841866 | A1 | 6/2021 |
| WO | 2019104512 | A1 | 6/2019 |

OTHER PUBLICATIONS

Substantive Technical Examination Report for Argentina Patent App. No. 20220101803, dated Nov. 18, 2025, 12 pages.

Communication pursuant to Article 94(3) EPC for European Patent. App. No. 22754639.7, dated Jun. 12, 2026, 3 pages.

* cited by examiner

INDEPENDENT REEL POSITION CONTROL FOR AN AGRICULTURAL HARVESTER HEADER

FIELD OF THE INVENTION

The exemplary embodiments of present invention relate generally to a header of a plant cutting machine (e.g., a combine harvester) having a reel assembly and, more specifically, to an independent reel position control system that enables each reel arm and reel segment of a reel assembly to move independently.

BACKGROUND OF THE INVENTION

Traditionally, a reel of a harvester header would be set to a fixed height above the cutterbar while remaining parallel to the width of the header. In fields where crop conditions vary across the width of the header, this parallel arrangement is not always ideal. Current reel construction includes a hydraulic system with cylinders arranged in series so that multiple reel arms function in synchronous motions, but which cannot be controlled independently. As such, in situations where there are some areas of down crop, the reel may be lowered to help pick up down crop but will engage the standing crop more than desired.

BRIEF SUMMARY OF THE INVENTION

In accordance with an exemplary embodiment there is provided a header for an agricultural harvester comprising a first reel including first and second reel ends, and a reel arm assembly operatively connected to the first reel. The reel arm assembly includes a first reel arm connected to the first reel end. The first reel arm includes a first pair of hydraulic cylinders, a first control valve, and a first swapping valve for operatively controlling the first reel arm. The reel arm assembly further includes a second reel arm connected to the second reel end. The second reel arm includes a second pair of hydraulic cylinders, a second control valve, and a second swapping valve for operatively controlling the second reel arm. The reel arm assembly further includes a hydraulic circuit operatively connected to the first pair of hydraulic cylinders and the second pair of hydraulic cylinders, wherein the first pair of hydraulic cylinders and the second pair of hydraulic cylinders are arranged in a parallel circuit relative to each other. Additionally, the reel arm assembly includes a controller operatively connected to each of the first and second reel arms for independently controlling a position of each of the first and second reel arms relative to the ground.

According to an aspect, the header further comprises a second reel including first and second reel ends, the second reel operatively connected to the reel arm assembly. The reel arm assembly further includes a third reel arm connected to the second reel at the second reel end, the third reel arm a third pair of hydraulic cylinders, a third control valve, and a third swapping valve for operatively controlling the third reel arm. The second reel arm is connected to the second reel at the first reel end of the second reel. The hydraulic circuit is operatively connected to the third pair of hydraulic cylinders, and the first pair of hydraulic cylinders, the second pair of hydraulic cylinders, and the third pair of hydraulic cylinders are arranged in a parallel circuit. The controller is operatively connected to each of the first, second, and third reel arms for independently controlling the positions of each of the first, second, and third reel arms relative to the ground.

Advantages arising from the exemplary embodiments include the capability of each reel arm in a reel assembly to be moved independently. Thus, the reel segment can be raised, lowered, tilted left, or tilted right to best engage the oncoming crop canopy contour regardless of the ground contour. This can be done automatically or selectively by operator command. This independent reel arm control is achieved via a parallel arrangement of reel arm hydraulic cylinders. A separate valve to control the actuation of each reel arm hydraulic cylinder provides the necessary independent control. A swapping valve is implemented to change between control of a raise/lower actuator and a fore/aft actuator for each reel arm.

Other features and advantages of the subject disclosure will be apparent from the following more detailed description of the exemplary embodiments.

BRIEF DESCRIPTION OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DRAWINGS

Figure 1:
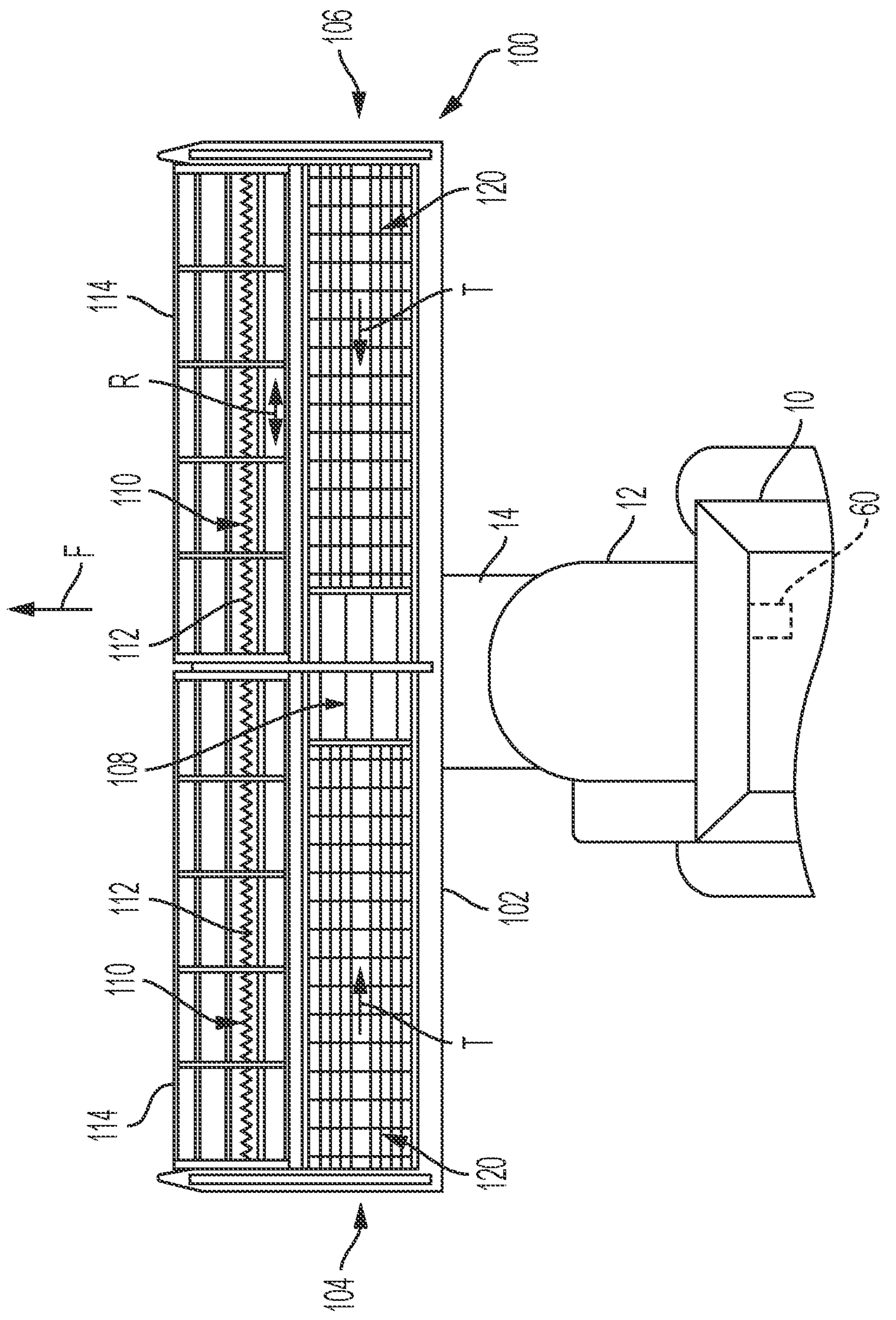
FIG. 1 is a top view of an agricultural harvester and a header in accordance with an exemplary embodiment of the subject disclosure.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art. "Exemplary" as used herein shall mean serving as an example.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Referring now to the drawings, and more particularly to FIG. 1, there is shown an exemplary embodiment of an agricultural vehicle 10 in the form of, e.g., a combine harvester or agricultural harvester which generally includes a chassis 12, a feeder housing or feederhouse 14, and an attachment in the form of a header 100. Typically, the agricultural harvester 10 will include additional internal systems for the separation and handling of collected crop material. However, these additional systems are not essential for a full and proper understanding of the subject disclosure.

The header 100 is coupled to, and supported by, the chassis 12 of the agricultural vehicle 10 by, for example, coupling to the feeder housing 14. In the exemplary embodiment shown, the header 100 is in the form of a draper header to harvest bushy or fluffy crop material. The header 100 has a frame 102 coupled to the chassis 12 by coupling to the feeder housing 14 and a pair of opposed lateral ends 104, 106. The header 100 may support one or more flexible cutter bar assemblies 110 with reciprocating knives 112 to cut crop material as the agricultural vehicle 10 travels in a forward direction, denoted by arrow F. The reciprocating knives 112, which may be referred to as cutting elements, can be reciprocated back-and-forth in a lateral direction, denoted by arrow R, relative to the forward direction F in a known manner, e.g., by a wobble box, epicyclic drive, etc. Exemplary cutting elements applicable to the present exemplary embodiments are disclosed, e.g., in U.S. Pat. Nos. 7,730,709 and 8,151,547, the entire disclosures of which are incorporated by reference herein in their entirety for all purposes.

The header 100 may further include a center feed belt 108 or a center auger that conveys the crop material into the feeder housing 14. The header 100 may also include one or more lateral, flexible draper belts 120 that are positioned rearwardly of the cutter bar assemblies 110 and travel, e.g. rotate, in opposing directions of travel, denoted by each arrow "T", in order to convey crop material inwardly to the center feed belt 108 and thereby the feeder housing 14. The header 100 may also include one or more rotating reels 114 with tines or the like to sweep the crop material inwardly towards the draper belts 120.

Figure 2:
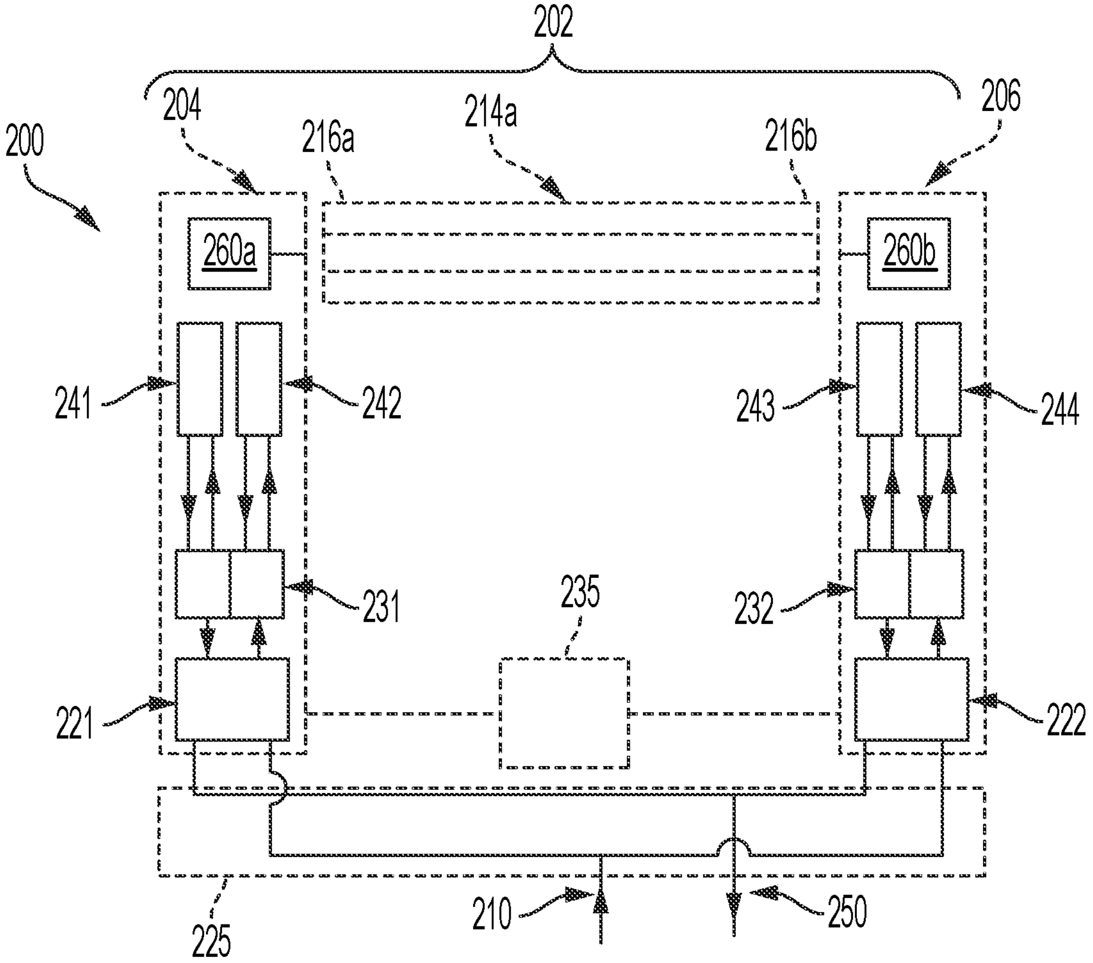
FIG. 2 is a partial schematic view of a header in accordance with an exemplary embodiment of the subject disclosure.

Referring to FIG. 2 there is shown in partial schematic form an exemplary embodiment of a header 200 according to the present disclosure. The header 200 comprises a first reel **214*a* comprising first and second reel ends 216*a*, 216*b*, and a reel arm assembly 202 operatively connected to the first reel. The reel arm assembly includes a first reel arm 204 operatively connected to the first reel end 216*a*. The first reel arm includes a first pair of linear actuators, e.g. hydraulic cylinders 241, 242, a first control valve 221, and a first swapping valve 231 for operatively controlling the first reel arm. The reel arm assembly 202 further includes a second reel arm 206 operatively connected to the second reel end 216*b*. The second reel arm includes a second pair of linear actuators, e.g., hydraulic cylinders 243, 244, a second control valve 222, and a second swapping valve 232 for operatively controlling the second reel arm. The reel arm assembly further includes a hydraulic circuit 225 operatively connected to the first pair of hydraulic cylinders and the second pair of hydraulic cylinders, whereby the first pair of hydraulic cylinders 241, 242 and the second pair of hydraulic cylinders 243, 244 are arranged in a parallel circuit. Additionally, the reel arm assembly includes a controller 235 operatively connected to each of the first and second reel arms 204, 206 for independently controlling a position of each of the first and second reel arms relative to the ground. In particular, the controller 235 is operatively connected to the first and second swapping valves 231, 232 that deliver hydraulic fluid to and receive hydraulic fluid from the first pair of hydraulic cylinders 241, 242 and the second pair of hydraulic cylinders 243, 244**, respectively.

The first swapping valve 231 is upstream the first pair of hydraulic cylinders 241, 242 and the second swapping valve 232 is upstream the second pair of hydraulic cylinders 243, 244. The first control valve 221 is upstream the first swapping valve 231 and the second control valve 222 is upstream the second swapping valve 232. The first pair of hydraulic cylinders includes a primary hydraulic cylinder 241 to raise or lower the first reel arm 204, and a secondary hydraulic cylinder 242 to move the first reel arm fore and aft. The first swapping valve 231 is operatively connected to the primary hydraulic cylinder 241 and the secondary hydraulic cylinder 242. The second pair of hydraulic cylinders includes a primary hydraulic cylinder 243 to raise or lower the second reel arm 206, and a secondary hydraulic cylinder 244 to move the second reel arm fore and aft. The second swapping valve 232 is operatively connected to the primary hydraulic cylinder 243 and the secondary hydraulic cylinder 244.

Operation of the hydraulic system of the header 200 is as follows. Hydraulic pressure is applied to the reel arm assembly 202 via a hydraulic fluid circuit input 210 and released from the reel arm assembly 202 via a hydraulic fluid circuit output 250. The hydraulic pressure is applied in parallel to the independent control valves 221 and 222 of each of the two reel arms 204, 206. This provides for a first aspect of independent control of the reel arm assembly according to the present disclosure, i.e., each reel arm in the reel arm assembly 202 can be controlled independently of the others owing to the reel arms being hydraulically connected in a parallel hydraulic circuit.

Independent control valves 221 and 222 are each positioned upstream of swapping valves 231 and 232, respectively, which, in turn, are each positioned upstream of hydraulic cylinders 241, 242, and 243, 244, respectively, on the hydraulic fluid circuit 225. The flow of hydraulic fluid to the hydraulic cylinders 241, 242, and 243, 244 can be controlled via swapping valves 231 and 232, respectively. This provides for a second aspect of independent control of the reel arm assembly according to the present disclosure, i.e., each hydraulic cylinder in the reel arm assembly 202 can be controlled independently of the others owing to the hydraulic cylinders being hydraulically connected in a parallel hydraulic circuit.

That is, the flow of hydraulic fluid to hydraulic cylinders 241 and 242 can be controlled via the swapping valve 231 such that hydraulic pressure is applied to hydraulic cylinder 241 only and in varying amounts, hydraulic pressure is applied to hydraulic cylinder 242 only and in varying amounts, hydraulic pressure is applied to both hydraulic cylinders 241 and 242 and in varying amounts, or no hydraulic pressure is applied to either of hydraulic cylinders 241 and 242. Likewise, the flow of hydraulic fluid to hydraulic cylinders 243 and 244 can be controlled via swapping valve 232 such that hydraulic pressure is applied to hydraulic cylinder 243 only and in varying amounts, hydraulic pressure is applied to hydraulic cylinder 244 only and in varying amounts, hydraulic pressure is applied to both hydraulic cylinders 243 and 244 and in varying amounts, or no hydraulic pressure is applied to either of hydraulic cylinders 243 and 244. As a result, each of the hydraulic cylinders 241, 242, 243, and 244 can be independently controlled to position and/or reposition the reel arm to which it is operatively connected. For example, hydraulic cylinders 241 and 243 can each be independently controlled to raise and/or lower the reel arms 204 and 206, respectively, while hydraulic cylinders 242 and 244 can each be independently controlled to respectively move the reel arms 204 and 206 fore and/or aft.

Figure 3:
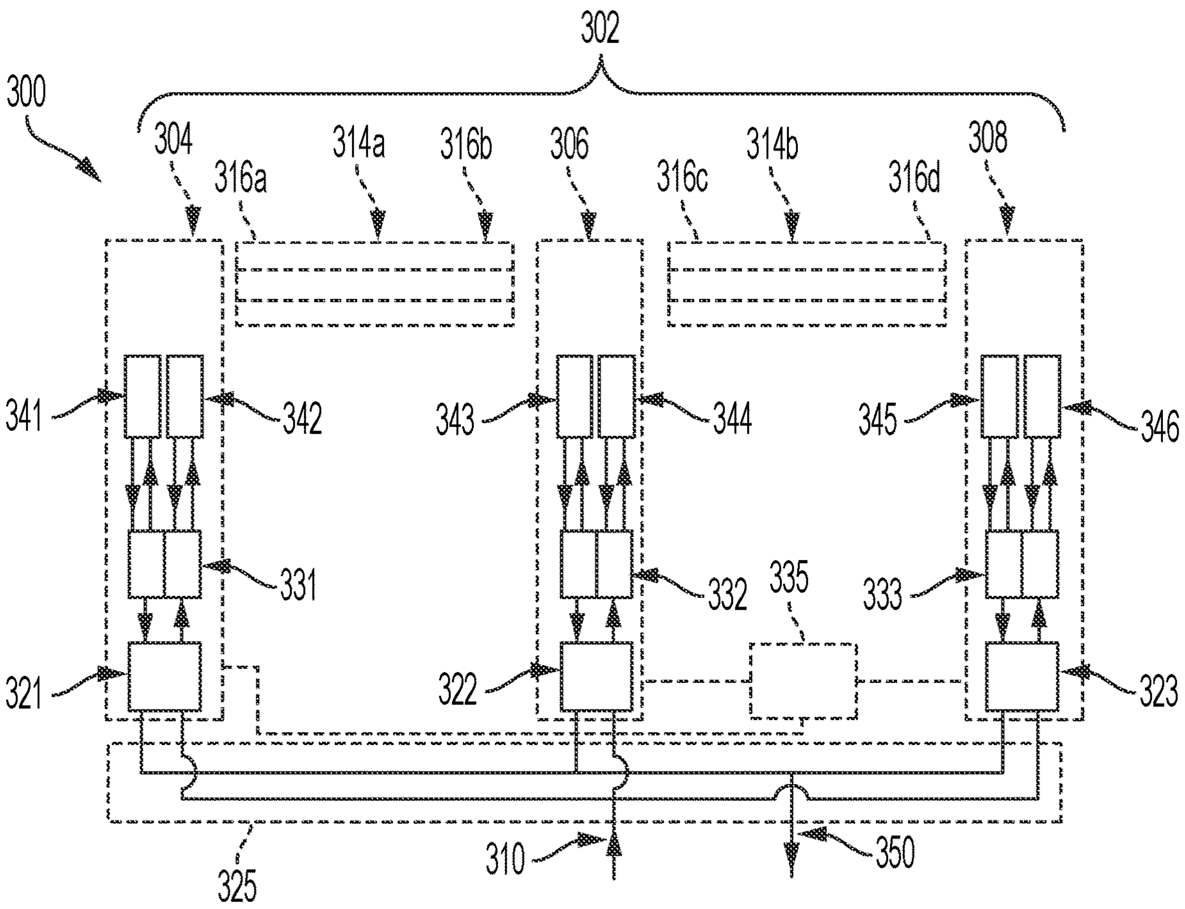
FIG. 3 is a partial schematic view of a header in accordance with another exemplary embodiment of the subject disclosure.

Referring to FIG. 3, there is shown in partial schematic form of another exemplary embodiment of a header 300 according to the present disclosure. It is understood that components of header 300 which numerically correspond to counterpart components in FIG. 2 are constructed and function substantially the same as those counterpart components. Accordingly, only those aspects of FIG. 3 which are in addition to those shown and described in connection with FIG. 2 will be described in detail.

The header 300 comprises a first reel **314*a* including first and second reel ends 316*a*, 316*b*, and a second reel 314*b* including first and second reel ends 316*c*, 316*d*. The reel arm assembly 302 further includes a first reel arm 304, a second reel arm 306, and a third reel arm 308. The third reel arm is operatively connected to the second reel 314*b* at the second reel end 316*d*. The third reel arm includes a third pair of linear actuators, e.g. hydraulic cylinders 345, 346, a third control valve 323, and a third swapping valve 333 for operatively controlling the third reel arm. The second reel arm 306 is operatively connected to both the second reel end 316*b* of first reel 314*a* and the second reel 314*b* at the first reel end 316*c* of the second reel. The hydraulic circuit 325 is operatively connected to the first pair of hydraulic cylinders 341, 342, the second pair of hydraulic cylinders 343, 344, and the third pair of hydraulic cylinders 345, 346, and arranged in a parallel circuit. In addition, the controller 335 is operatively connected to each of the first, second, and third reel arms 304, 306, 308** for independently controlling the positions of each of the first, second, and third reel arms relative to the ground.

Operation of the hydraulic system of the header 300 is as follows. Hydraulic pressure is applied to the reel arm assembly 302 via a hydraulic fluid circuit input 310 and released from the reel arm assembly via a hydraulic fluid circuit output 350. The hydraulic pressure is applied in parallel to the independent control valves 321, 322, and 323 of each of three reel arms 304, 306 and 308. Therefore, each reel arm in the reel arm assembly 302 can be controlled independently of the others.

Independent control valves 321, 322, and 323 are each positioned upstream of swapping valves 331, 332, and 333, respectively, which, in turn, are each positioned upstream of hydraulic cylinders 341, 342, and 343, 344, and 345, 346, respectively, on hydraulic fluid circuit 325. The flow of hydraulic fluid to hydraulic cylinders 341, 342, and 343, 344, and 345, 346 can be controlled via swapping valves 331, 332, and 333, respectively. Therefore, each hydraulic cylinder in the reel arm assembly 300 can be controlled independently of the others.

That is, the flow of hydraulic fluid to hydraulic cylinders 341 and 342 can be controlled via swapping valve 331 such that hydraulic pressure is applied to hydraulic cylinder 341 only and in varying amounts, hydraulic pressure is applied to hydraulic cylinder 342 only and in varying amounts, hydraulic pressure is applied to both hydraulic cylinders 341 and 342 and in varying amounts, or no hydraulic pressure is applied to either of hydraulic cylinders 341 and 342. Likewise, the flow of hydraulic fluid to hydraulic cylinders 343 and 344 can be controlled via swapping valve 332 such that hydraulic pressure is applied to hydraulic cylinder 343 only and in varying amounts, hydraulic pressure is applied to hydraulic cylinder 344 only and in varying amounts, hydraulic pressure is applied to both hydraulic cylinders 343 and 344 and in varying amounts, or no hydraulic pressure is applied to either of hydraulic cylinders 343 and 344. Likewise, the flow of hydraulic fluid to hydraulic cylinders 345 and 346 can be controlled via swapping valve 333 such that hydraulic pressure is applied to hydraulic cylinder 345 only and in varying amounts, hydraulic pressure is applied to hydraulic cylinder 346 only and in varying amounts, hydraulic pressure is applied to both hydraulic cylinders 345 and 346 and in varying amounts, or no hydraulic pressure is applied to either of hydraulic cylinders 345 and 346. As a result, each of hydraulic cylinders 341, 342, 343, 344, 345, and 346 can be independently controlled to position and/or reposition the reel arm to which it is operatively connected. For example, hydraulic cylinders 341, 343, and 345 can each be independently controlled to raise and/or lower the reel arms to which each is respectively operatively connected, while hydraulic cylinders 342, 344, and 346 can each be independently controlled to move the reel arms to which each is operatively connected fore and/or aft.

Figure 4A:
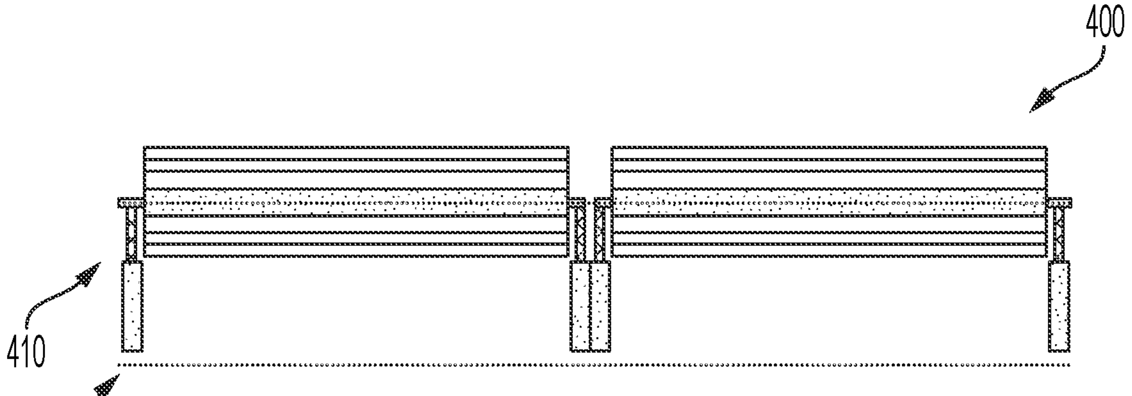
FIG. 4A PRIOR ART
FIG. 4A is a partial top schematic view of a reel and reel arm assembly in accordance with the prior art in a first position.
Figure 4B:
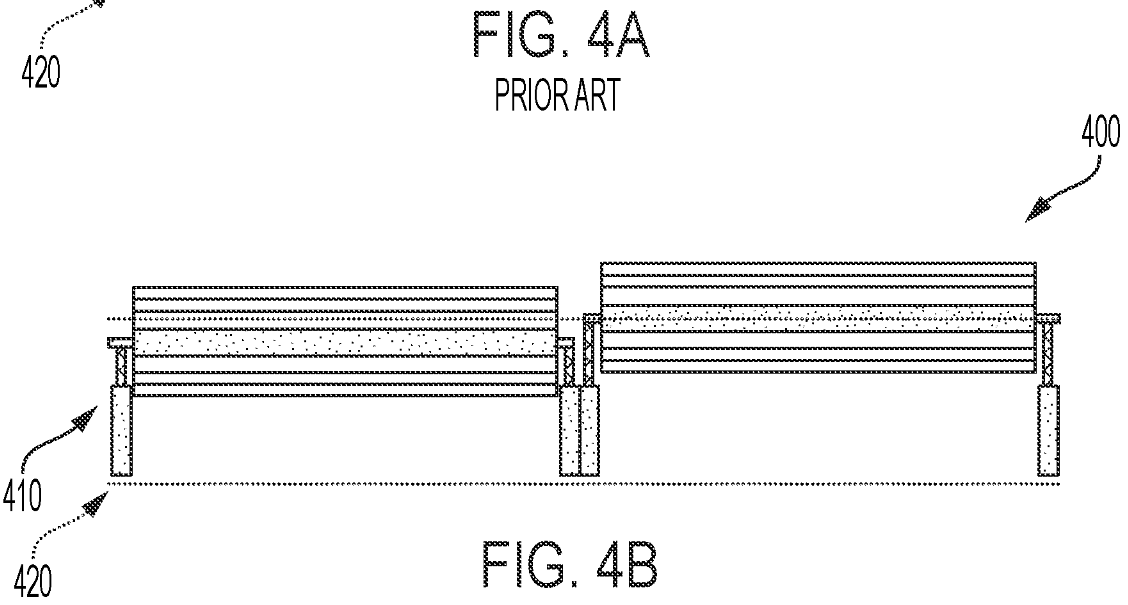
FIG. 4B PRIOR ART
FIG. 4B is a partial top schematic view of the reel and reel arm assembly of FIG. 4A in a second position.
Figure 5A:
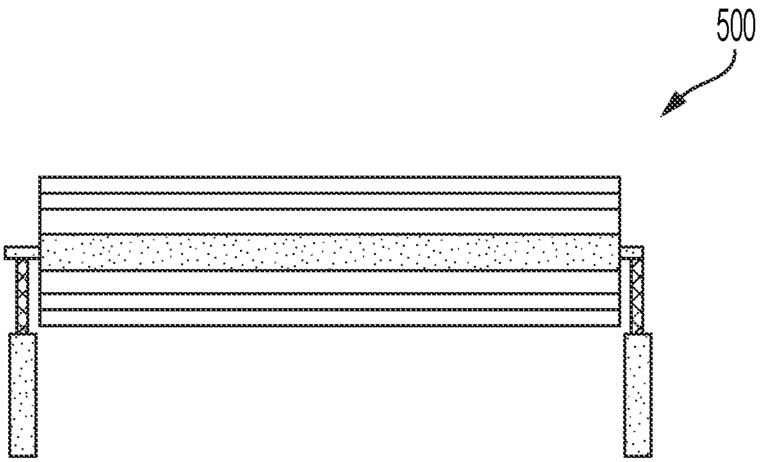
FIG. 5A is a partial top schematic view of a reel and reel arm assembly in accordance with the subject disclosure in a first position.
Figure 5B:
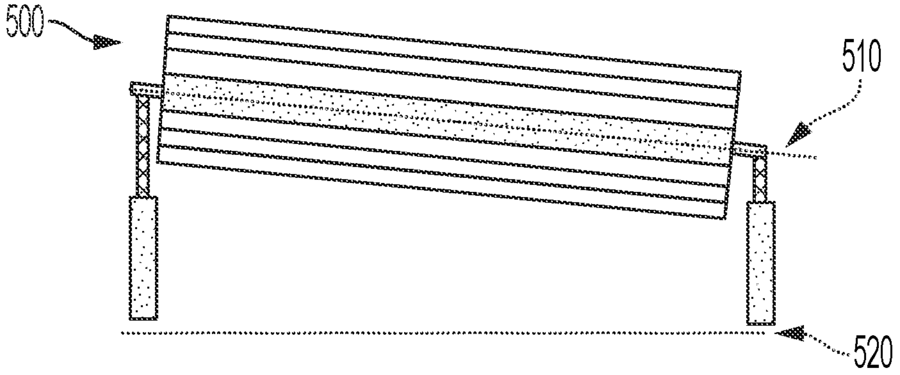
FIG. 5B is a partial top schematic view of the reel and reel arm assembly of FIG. 5A in a second position.
Figure 5C:
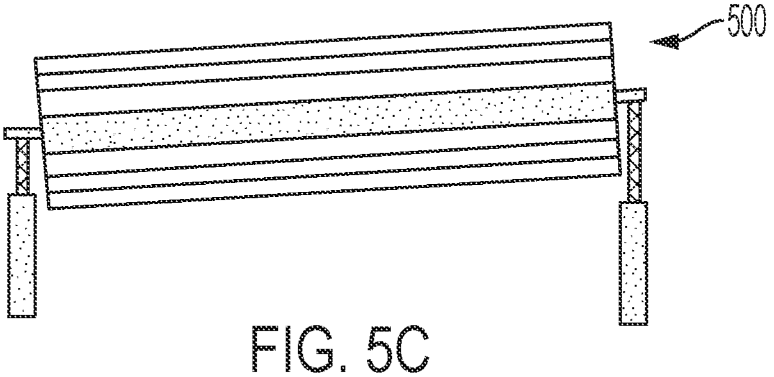
FIG. 5C is a partial top schematic view of the reel and reel arm assembly of FIG. 5A in a third position.
Figure 6A:
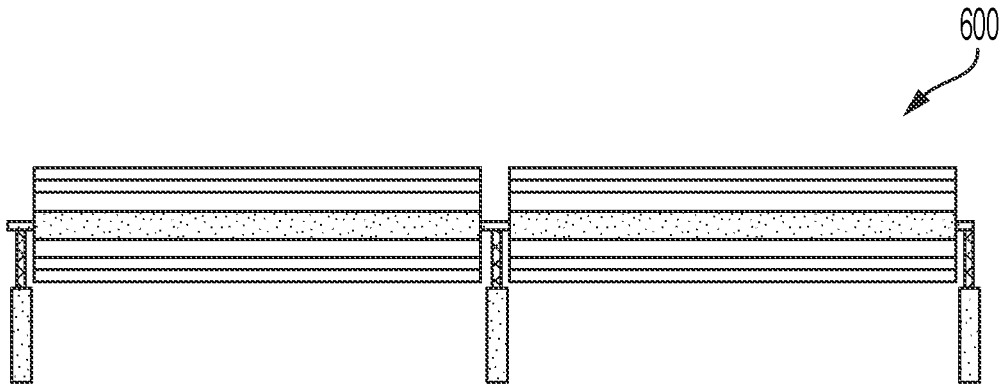
FIG. 6A is a partial top schematic view of another reel and reel arm assembly in accordance with the subject disclosure in a first position.
Figure 6B:
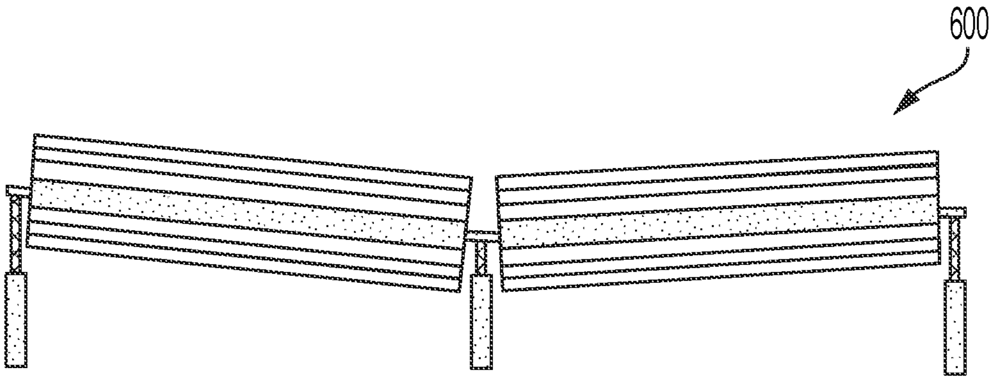
FIG. 6B is a partial top schematic view of the reel and reel arm assembly of FIG. 6A in a second position.
Figure 6C:
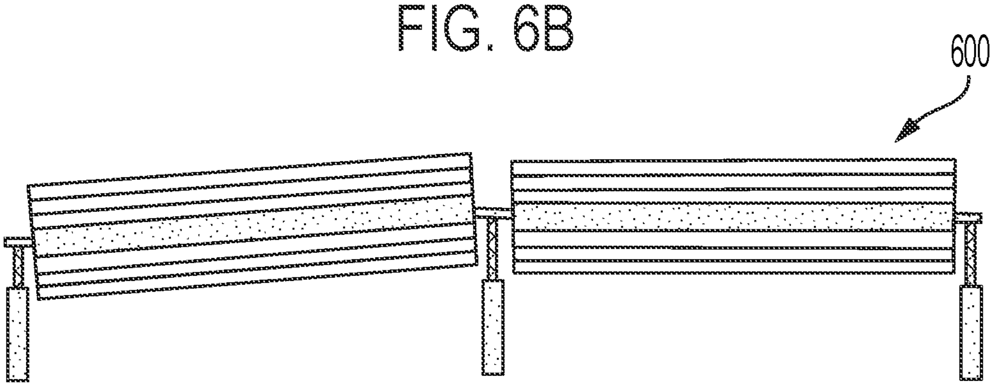
FIG. 6C is a partial top schematic view of the reel and reel arm assembly of FIG. 6A in a third position.
Figure 7A:
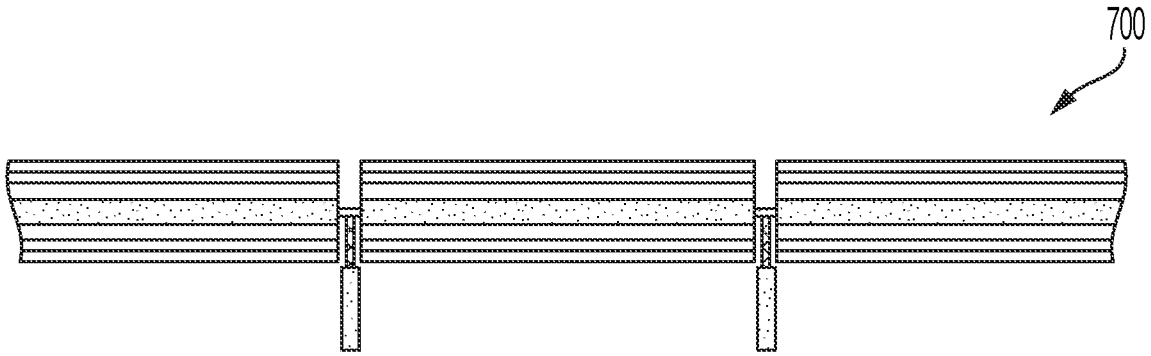
FIG. 7A is a partial top schematic view of another reel and reel arm assembly of the subject disclosure in a first position.
Figure 7B:
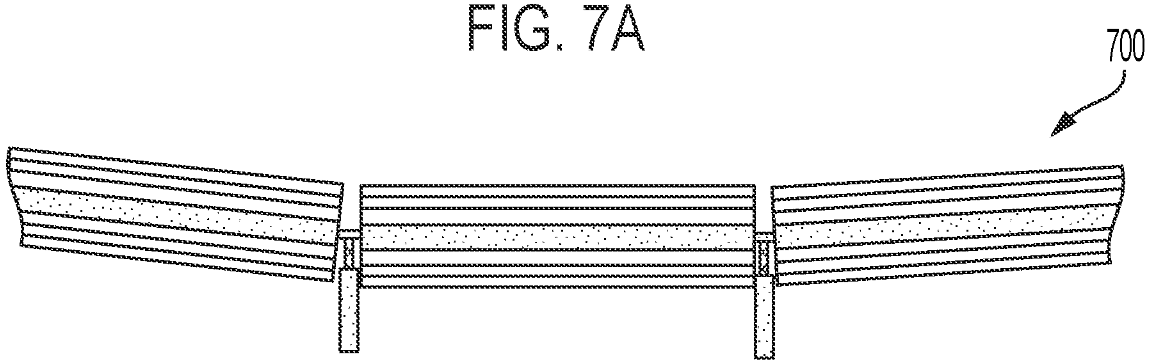
FIG. 7B is a partial top schematic view of the reel and reel arm assembly of FIG. 7A in a second position.
Figure 7C:
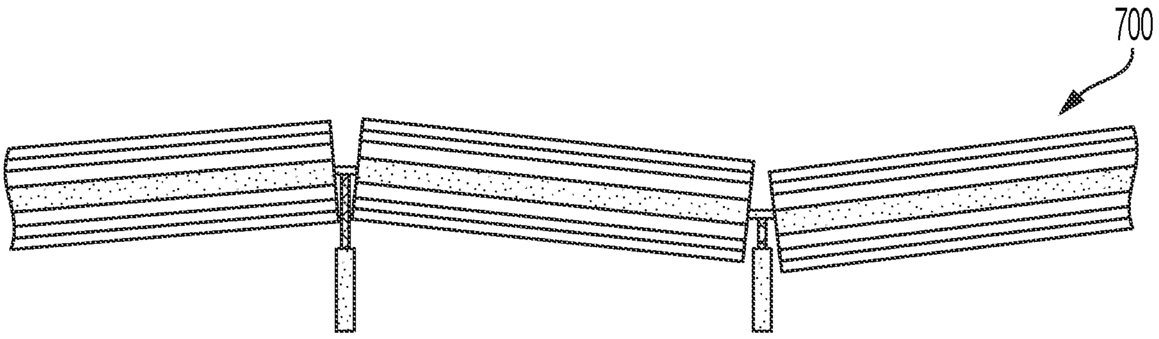
FIG. 7C is a partial top schematic view of the reel and reel arm assembly of FIG. 7A in a third position.

Referring to FIGS. 4A and 4B, there is shown a partial top schematic view of a header 400 having a two-segment reel and reel arm assembly in accordance with the prior art. In the prior art reel assembly, the rotational axis 410 of each reel segment always remains parallel to the cutterbar 420 even when the reel segments are moved from a first position (FIG. 4A) to a second position (FIG. 4B).

Referring to FIGS. 5A-5C, 6A-6C, and 7A-7C, there are shown partial top schematic view of headers 500, 600 and 700 respectively having a one-, two-, and three-segment reel and reel arm assemblies in accordance with exemplary embodiments of the present disclosure. In contrast to the prior art two-segment reel and reel arm assembly depicted in FIGS. 4A and 4B, each individual segment of the one-, two-, and three-segment reel and reel arm assemblies of FIGS. 5A-5C, 6A-6C, and 7A-7C, respectively, can be independently positioned relative to each other such that the rotational axis of a given segment e.g., 510, is not parallel, or angled, or at a non-parallel angle in relation to a longitudinal axis of the cutterbar 520.

In accordance with the subject disclosure, there is further provided an agricultural harvester comprising any of the headers discussed above and shown in FIGS. 2, 3, 5A-5C, 6A-6C, and 7A-7C. Further, as shown in FIG. 1, the agricultural harvester 10 includes a control unit 60 in communication with the controller 235 (FIG. 2) or controller 335 (FIG. 3) to enable a user to independently operate the several hydraulic cylinders that manipulate the reels 214*a*, 314*a* and 314*b*. In addition to the control unit 60, the reel arms can be equipped with sensors, e.g., sensors 260*a*, 260*b* carried by reel arms 204, 206 (FIG. 2), that sense at least one working condition of the header including, without limitation, reel height and/or cutter bar assembly elevation, to provide feedback to the controller 235 whereby the controller controls operation of the swapping valves 231, 232 and, in turn, each of the hydraulic cylinders 241, 242, 243, and 244. That is, e.g., the controller is operatively in communication with the sensors 260*a*, 260*b* and configured to engage the swapping valves 231, 232 either independently or in combination to operate the hydraulic cylinders 241, 242, 243, 244 to move the reel arms to predetermined positions based on the sensed position or input from the sensors. In other words, the controller or control unit includes a processor and a memory having stored thereon complex instructions executable by the processor to receive input from the controller, determine the position of the reel arm based on the received input from the sensor, and move or reposition the reel arm to a predetermined position based on the received input of the sensor or determined position of the reel arm.

Moreover, although the foregoing description provides for linear actuators in the exemplary form of hydraulic cylinders to raise and lower the reel arms and move the reel ends fore and aft, it is also contemplated that other types of linear actuators may also be employed to serve the same purposes. For instance, linear actuators in the form of electromechanical linear actuators including, without limitation, screw jacks and the like may be used to raise and lower the reel arms and move the reel ends fore and aft. Such electromechanical linear actuators would receive their electrical power from an electrical circuit deriving its source of power form the agricultural vehicle 10, and would be controlled by a plurality of controllers, each controller operatively connected to one of a first reel arm and a second reel arm.

By way of example, but not limitation, an alternative header for an agricultural harvester can comprise a first reel including first and second ends, and a reel arm assembly operatively connected to the first reel. The reel arm assembly would include a first reel arm connected to the first reel end, wherein the first reel arm includes a first pair of linear actuators for operatively controlling the first reel arm. The reel arm assembly would additionally include a second reel arm connected to the second reel end, wherein the second reel arm includes a second pair of linear actuators for operatively controlling the second reel arm. The reel arm assembly would additionally include an electrical circuit connected to the first pair of linear actuators and the second pair of linear actuators, wherein the first pair of linear actuators and the second pair of linear actuators are arranged in a parallel circuit. Lastly, the header would include a controller operatively connected to each of the first and second reel arms for independently controlling a position of each of the first and second reel arms relative to the ground.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

We claim:

1. A header of an agricultural harvester comprising:

a first reel including first and second reel ends;

a reel arm assembly operatively connected to the first reel, the reel arm assembly including:

a first reel arm connected to the first reel end, the first reel arm including a first pair of hydraulic cylinders, a first control valve, and a first swapping valve that operatively controls the first reel arm;

wherein the first pair of hydraulic cylinders includes a primary hydraulic cylinder to raise or lower the first reel arm, and a secondary hydraulic cylinder to move the first reel end of the first reel fore or aft; and wherein the first swapping valve is operatively connected to each of the primary and secondary hydraulic cylinders of the first pair of hydraulic cylinders to change between control of the primary and secondary hydraulic cylinders of the first pair of hydraulic cylinders;

a second reel arm connected to the second reel end, the second reel arm including a second pair of hydraulic cylinders, a second control valve, and a second swapping valve that operatively controls the second reel arm;

wherein the second pair of hydraulic cylinders includes a primary hydraulic cylinder to raise or lower the second reel arm, and a secondary hydraulic cylinder to move the second reel end of the first reel fore or aft; and wherein the second swapping valve is operatively connected to each of the primary and secondary hydraulic cylinders of the second pair of hydraulic cylinders to change between control of the primary and secondary hydraulic cylinders of the second pair of hydraulic cylinders; and a hydraulic circuit operatively connected to the first pair of hydraulic cylinders and the second pair of hydraulic cylinders, wherein the first pair of hydraulic cylinders and the second pair of hydraulic cylinders are arranged in a parallel circuit; and a controller operatively connected to each of the first and second reel arms that independently controls a position of each of the first and second reel arms relative to the ground.

2. The header of claim 1, further comprising a second reel including first and second reel ends, the second reel being operatively connected to the reel arm assembly, wherein the reel arm assembly further comprises:

a third reel arm connected to the second reel at the second reel end of the second reel, the third reel arm including a third pair of hydraulic cylinders, a third control valve, and a third swapping valve that operatively controls the third reel arm;

wherein the second reel arm is connected to the second reel at the first reel end of the second reel;

wherein the hydraulic circuit is operatively connected to the third pair of hydraulic cylinders;

wherein the first pair of hydraulic cylinders, the second pair of hydraulic cylinders, and the third pair of hydraulic cylinders are arranged in a parallel circuit; and wherein the controller is operatively connected to each of the first, second, and third reel arms for independently controlling the positions of each of the first, second, and third reel arms relative to the ground.

3. The header of claim 1, wherein the first swapping valve is upstream from the first pair of hydraulic cylinders, and the second swapping valve is upstream from the second pair of hydraulic cylinders.

4. The header of claim 1, wherein the first control valve is upstream from the first swapping valve, and the second control valve is upstream from the second swapping valve.

5. The header of claim 1, wherein the controller is operatively connected to the first and second swapping valves.

6. The header of claim 1, further comprising a sensor in communication with the controller for sensing at least one working condition of the header.

7. An agricultural harvester with a header, the header comprising:

a first reel including first and second reel ends;

a reel arm assembly operatively connected to the first reel, the reel arm assembly including:

a first reel arm connected to the first reel end, the first reel arm including a first pair of hydraulic cylinders, a first control valve, and a first swapping valve that operatively controls the first reel arm;

wherein the first pair of hydraulic cylinders includes a primary hydraulic cylinder to raise or lower the first reel arm, and a secondary hydraulic cylinder to move the first reel end of the first reel fore or aft; and wherein the first swapping valve is operatively connected to each of the primary and secondary hydraulic cylinders of the first pair of hydraulic cylinders to change between control of the primary and secondary hydraulic cylinders of the first pair of hydraulic cylinders;

a second reel arm connected to the second reel end, the second reel arm including a second pair of hydraulic cylinders, a second control valve, and a second swapping valve that operatively controls the second reel arm;

wherein the second pair of hydraulic cylinders includes a primary hydraulic cylinder to raise or lower the second reel arm, and a secondary hydraulic cylinder to move the second reel end of the first reel fore or aft; and wherein the second swapping valve is operatively connected to each of the primary and secondary hydraulic cylinders of the second pair of hydraulic cylinders to change between control of the primary and secondary hydraulic cylinders of the second pair of hydraulic cylinders; and a hydraulic circuit operatively connected to the first pair of hydraulic cylinders and the second pair of hydraulic cylinders, wherein the first pair of hydraulic cylinders and the second pair of hydraulic cylinders are arranged in a parallel circuit; and a controller operatively connected to each of the first and second reel arms that independently controls a position of each of the first and second reel arms relative to the ground.

8. The agricultural harvester of claim 7, further comprising a control unit in communication with the controller.

9. A header of an agricultural harvester comprising:

a first reel including first and second reel ends;

a reel arm assembly operatively connected to the first reel, the reel arm assembly including:

a first reel arm connected to the first reel end, the first reel arm including a first pair of linear actuators that operatively controls the first reel arm;

wherein the first pair of linear actuators includes a primary linear actuator to raise or lower the first reel arm, and a secondary linear actuator to move the first reel end of the first reel fore or aft;

a second reel arm connected to the second reel end, the second reel arm including a second pair of linear actuators that operatively controls the second reel arm;

wherein the second pair of linear actuators includes a primary linear actuator to raise or lower the second reel arm, and a secondary linear actuator to move the second reel end of the first reel fore or aft;

an electrical circuit operatively connected to the first pair of linear actuators and the second pair of linear actuators, wherein the first pair of linear actuators and the second pair of linear actuators are arranged in a parallel circuit; and a controller operatively connected to each of the first and second reel arms that independently controls a position of each of the first and second reel arms relative to the ground and that independently controls a fore/aft position of each of the first and second reel ends.

10. The header of claim 9, wherein the first pair of linear actuators comprises electromechanical linear actuators, and the second pair of linear actuators comprises electromechanical linear actuators.

11. The header of claim 10, wherein the electromechanical linear actuators of the first pair of linear actuators are screw jacks, and the electromechanical linear actuators of the second pair of linear actuators are screw jacks.

* * * * *